US008860756B2

(12) United States Patent
Boreham et al.

(10) Patent No.: US 8,860,756 B2
(45) Date of Patent: Oct. 14, 2014

(54) AUTOMATIC IMAGE CROPPING

(75) Inventors: Ian Robert Boreham, Gordon (AU);
Allen Peter Courtney, Brooklyn (AU)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 12/630,459

(22) Filed: Dec. 3, 2009

(65) Prior Publication Data
US 2010/0156931 A1  Jun. 24, 2010

(30) Foreign Application Priority Data

Dec. 18, 2008 (AU) .................................. 2008259357

(51) Int. Cl.
G09G 5/00 (2006.01)
G06T 11/60 (2006.01)

(52) U.S. Cl.
CPC ........................................ *G06T 11/60* (2013.01)
USPC .......................................................... 345/620

(58) Field of Classification Search
CPC .................. G06T 7/0079; G06T 11/60; G06T 2207/20021; G06T 2207/20132
USPC .............................. 345/620–628; 382/282–283
See application file for complete search history.

(56) References Cited

U.S. PATENT DOCUMENTS

| 7,133,050 | B2 | 11/2006 | Schowtka | 345/620 |
| 7,133,571 | B2 | 11/2006 | Cheatle | 382/282 |
| 7,262,781 | B2 * | 8/2007 | Balinsky et al. | 345/620 |
| 7,945,116 | B2 * | 5/2011 | Curtis | 382/282 |
| 2005/0025387 | A1 | 2/2005 | Luo | 382/298 |
| 2005/0094205 | A1 * | 5/2005 | Lo et al. | 358/1.18 |
| 2006/0072847 | A1 * | 4/2006 | Chor et al. | 382/282 |
| 2006/0139371 | A1 | 6/2006 | Lavine et al. | 345/620 |
| 2006/0188173 | A1 | 8/2006 | Zhang et al. | 382/276 |

FOREIGN PATENT DOCUMENTS

| JP | 2006-129124 | 5/2006 |
| JP | 2007-318393 | 12/2007 |
| JP | 2008-052709 | 3/2008 |

OTHER PUBLICATIONS

Japanese Office Action dated Jul. 29, 2011, in Japanese Application No. 2009-279792.

* cited by examiner

*Primary Examiner* — Xiao Wu
*Assistant Examiner* — Charles Tseng
(74) *Attorney, Agent, or Firm* — Fitzpatrick, Cella, Harper & Scinto

(57) ABSTRACT

Disclosed is a method of producing a cropped image from an original image for a given target crop region. The method comprising receives a plurality of example crops, each example crop corresponding to at least a part of the original image. Two example crops are selected based on at least a property of the target crop region. The method interpolates between the selected example crops to determine a crop window, crops the original image with the determined crop window to produce the cropped image.

17 Claims, 14 Drawing Sheets

AUTOMATIC IMAGE CROPPING

CROSS-REFERENCE TO RELATED PATENT APPLICATIONS

This application claims the right of priority under 35 U.S.C. §119 based on Australian Patent Application No. 2008259357, filed Dec. 18, 2008, which is incorporated by reference herein in its entirety as if fully set forth herein.

TECHNICAL FIELD

The present invention relates to software-implemented methods and processes for the automated cropping of digital images.

BACKGROUND

Digital images are widely used in many forms of communication. Examples of media where such images are used include posters, magazines, newsletters, photo albums, invitations, web pages and many others. The position and size at which to display or otherwise reproduce a digital image on a page is determined by the layout of the page. However digital images are often created with little knowledge of the context in which they will be used.

An image may not fit well into a layout because of the difference between an original height or width of the image and the required height or width at which the image is to be reproduced. The required bounds can be of any height, width and aspect ratio. Often, an image needs to be cropped in order to fit into the bounds determined by a layout.

In many cases, the same digital image is reused multiple times under various contexts, and therefore needs to be cropped to various sizes to fit into different layouts accordingly. In addition, a designer, in the process of designing a layout, may need to adjust the layout design from time to time. Each time the layout is adjusted, the image may require re-cropping to fit into whatever new boundary is specified.

To crop a digital image manually requires a user to indicate the position and the size of the crop using an input device of a computer system. To crop the same image over and over again manually is a time-consuming, tedious, error-prone and frustrating experience for the user. Software that provides an automatic image-cropping feature can make the process easier for the user by automatically positioning a crop window of the required size in a digital image.

Some software takes a simplistic approach towards automatic image cropping. An example of a simplistic approach involves centring the crop window over the digital image to be cropped, based on the assumption that the main subject of the image is usually positioned in the centre. Such software has no knowledge about the actual locations of the main subject(s) in the original image. Simply positioning the crop window at the centre can produce some very undesirable crops, e.g. cropping away half of a person's face.

In order to produce more acceptable crops, a software system that does automatic image cropping needs to incorporate some knowledge regarding the subjects captured by a digital image, for example, the positions and sizes of the main subjects. Such information can come from either a human user or a software system that performs automatic subject-detection on digital images.

One such approach proposes a possible crop window of a particular aspect ratio specified by a user. The proposed crop window is positioned at the centre of the main subject area, where the main subject area is the smallest possible rectangular area that contains all the main subjects. This method nevertheless relies on users to manually adjust the position of the crop window in order to achieve a reasonable crop.

SUMMARY

Disclosed is a method of producing a cropped image from an original image for a given target crop region. The method receives a plurality of example crops, each example crop corresponding to at least a part of the original image. Two example crops are selected based on at least a property of the target crop region. The method interpolates between the selected example crops to determine a crop window, and crops the original image with the determined crop window to produce the cropped image.

BRIEF DESCRIPTION OF THE DRAWINGS

At least one embodiment of the present invention will now be described with reference to the following drawings, in which.

DETAILED DESCRIPTION INCLUDING BEST MODE

Hardware Platform

Figure 1:
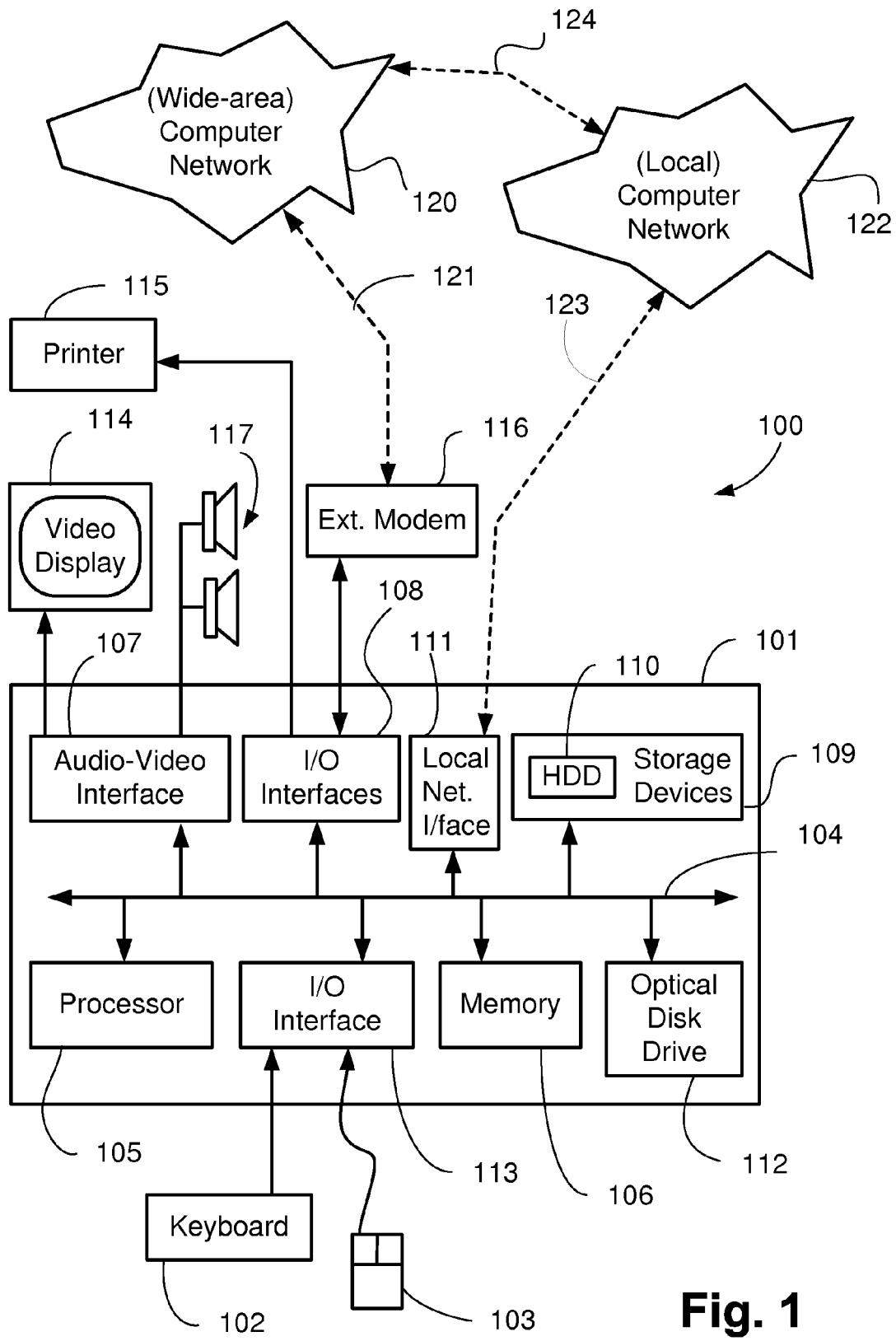
FIG. 1 is a schematic block diagram of a general purpose computer system on which the arrangements to be described may be practised.

The automated image cropping methods and arrangements to be described may be implemented using a computer system 100, such as that shown in FIG. 1 wherein the processes of FIGS. 2 to 14 may be implemented as software, such as one or more application programs executable within the computer system 100. In particular, the steps of the methods are effected by instructions in the software that are carried out within the computer system 100. The instructions may be formed as one or more code modules, each for performing one or more particular tasks. The software may also be divided into two separate parts, of which a first part and the corresponding code modules perform the cropping functions, and a second part and the corresponding code modules manage a user interface between the first part and the user. The software may be stored in a computer readable storage medium, including the storage devices described below, for example. The software is loaded into the computer system 100 from the computer readable storage medium, and then executed by the computer system 100. A computer readable storage medium having such software or computer program recorded on it is a computer program product. The use of the computer program product in the computer system 100 preferably effects an advantageous apparatus for cropping images.

As seen in FIG. 1, the computer system 100 is formed by a computer module 101, input devices such as a keyboard 102 and a mouse pointer device 103, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g. cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide-area network 120 via a connection 124, which would typically include a so-called "firewall" device or similar functionality. The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such as optical disks (e.g. CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable storage media refers to any non-transitory tangible storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transitory or non-tangible computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

Automatic Image Cropping

Presently disclosed are methods which involve processing a digital image, and metadata associated with the digital image, to produce an adequate crop of the digital image with user-specified dimension, such as at least one of height and width, or aspect ratio. In simple terms, cropping involves selecting a region of the image, known as the "crop window", whose contents are desired to be displayed on the page in an allocated region called the target crop region. Regions of the image outside the crop window are not displayed.

Figure 2:
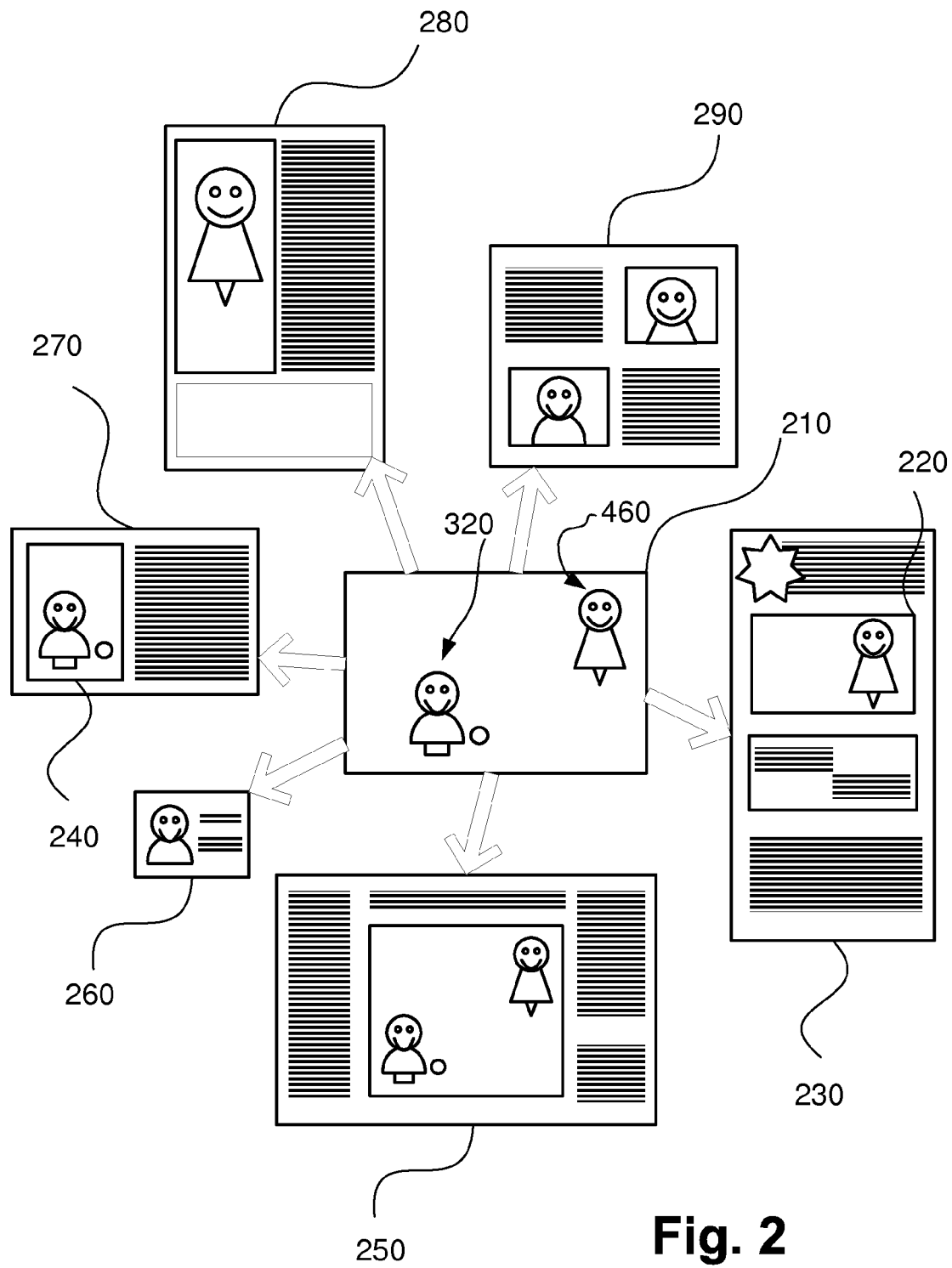
FIG. 2 shows a digital image and several documents associated with the digital image.

FIG. 2 shows a few hypothetical examples of how an image or a crop of the image can be used in different contexts for various document types.

In the centre of FIG. 2, an original digital image 210, for example stored in a memory unit 106, is processed by the processor 105 to produce a crop 220 of the original digital image 210. An exemplary document 230 illustrates the usage of the cropped image 220. A different crop 240 of the digital image 210 is shown in a different exemplary document 270. Several other exemplary documents 250, 260, 280, 290 are shown. Each of the documents contains a crop of different size or aspect ratio of the said digital image 210.

As will be apparent from FIG. 2, the original image 210 has two dominant subjects 460 and 320 and either of which, or parts of which would ordinarily be desired by a user to be the focus of a crop of the image 210. For example, the document 230 includes the entirety of only the subject 460, whereas the document 290 includes separately a portion of each of the subjects 460 and 320, and the document 250 includes the entirety of the subjects 460 and 320 in their original positions within a crop of the overall image.

The required height and width dimensions of the cropped image 220 are determined by the layout of the document 230. Similarly, the required height and width dimensions of the cropped image 240 are determined by the layout of the document 270.

Figure 3A:
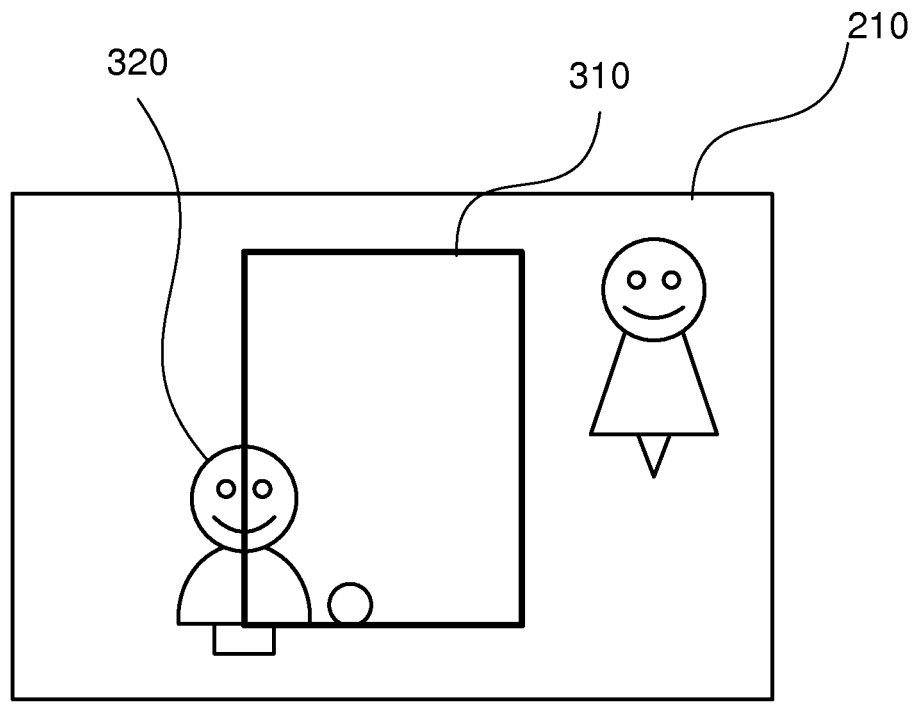
FIGS. 3A and 3B show two digital images and their corresponding crop windows.
Figure 3B:
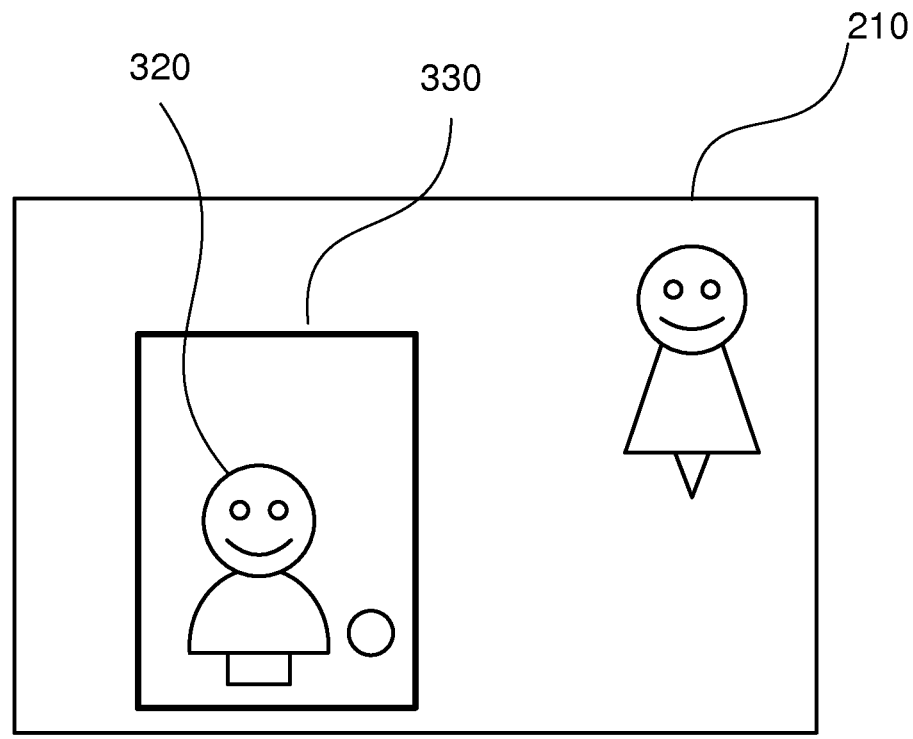

To determine an adequate crop of an image is not a trivial task. FIG. 3A shows that a first crop window 310 placed arbitrarily in the middle of the digital image 210 can produce a rather unpleasant outcome. The cropped image 310 contains half of the face of the subject 320, cropping away part of the face. This is undesirable in most use cases. On the other hand, a second crop window 330 shown in FIG. 3B may be considered as acceptable in many cases as the window 330 contains the entire face of the subject 320.

However, for a computer system 100 to make intelligent decisions as where to place the crop window within a digital image, the system 100 must have some knowledge regarding the composition of the image. There are a number of ways such information could be obtained. One example involves the use of an automatic subject-detection system that provides information regarding the positions of the main subjects in an image. Another way of obtaining image composition information is to receive inputs from a human operator or user of the system, or whomever captured the original image 210. A human designer can provide examples of good crops by marking the digital image, when displayed on the display device 114 within the aforementioned GUI, by using a keyboard 102 or a mouse 103. The received information from the GUI is processed by a computer system 100 to perform automated image cropping.

The arrangements described below provide means for an automated cropping system to receive image composition information and select one or two example crops to be used to calculate the position and size of the target crop window based on user requirements.

Figure 4:
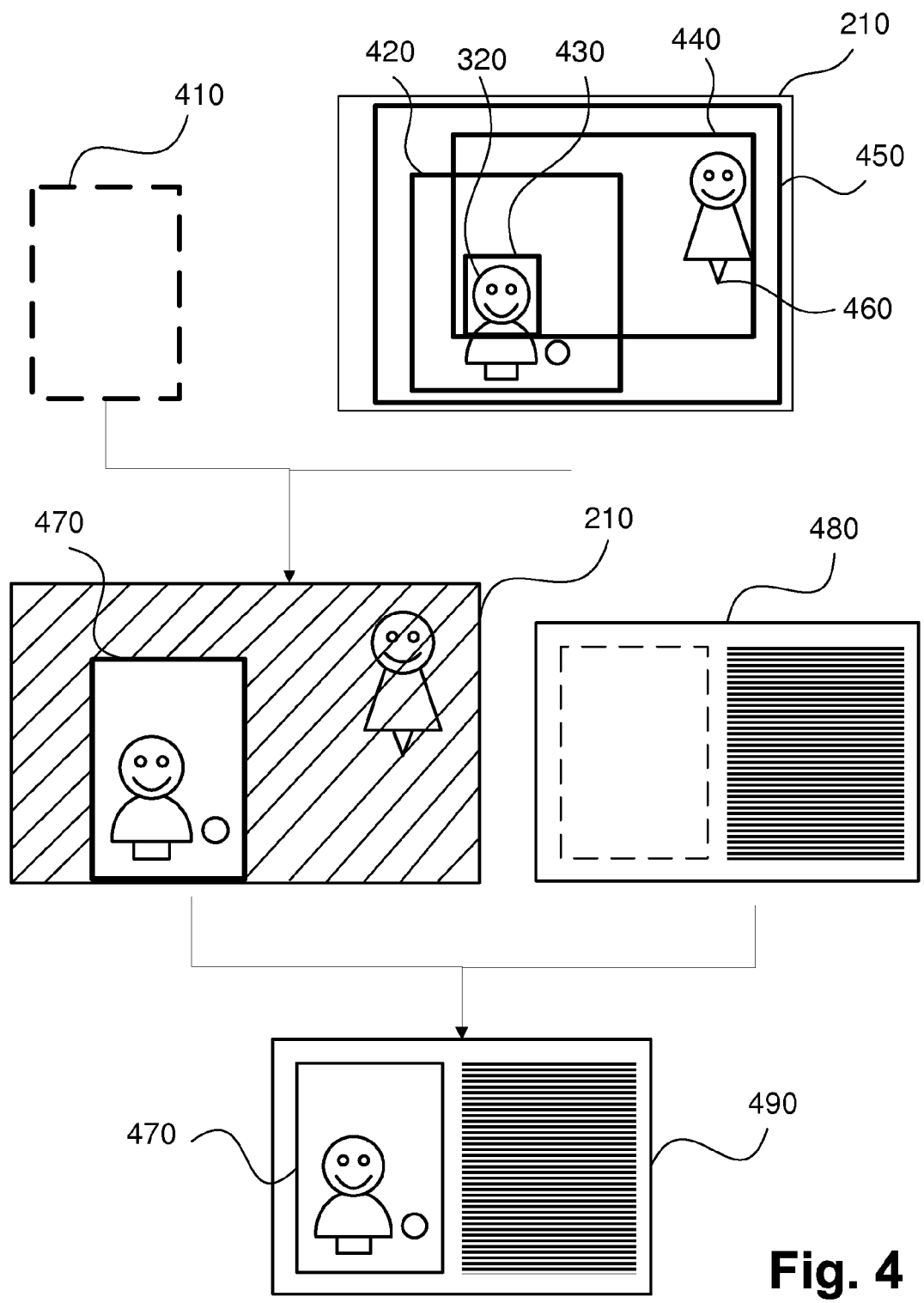
FIG. 4 shows a story board of the image cropping process.

FIG. 4 illustrates how one presently disclosed approach is used to crop a digital image so that the cropped image fits into a layout. In this example, a target crop region 410 is received for cropping the image 210, together with four example crops 420, 430, 440 and 450 of the image 210. The example crops may have been performed by the user. The first example crop 420 contains the face of the human boy 320 and its surroundings. The second example crop 430 contains predominantly the face of the human boy 320. The third example crop 440 contains the face of the human boy 320 and an entirety of the subject 460, being a human girl. The fourth example crop 450 fully contains all the other three example crops 420, 430 and 440. Upon receiving this information, an automated cropping process according to the present disclosure selects some of the example crops and performs calculations on the selected example crops to produce a crop window 470. The image region within the crop window 470 is combined with the target document layout 480 to produce the final document 490.

Figure 5:
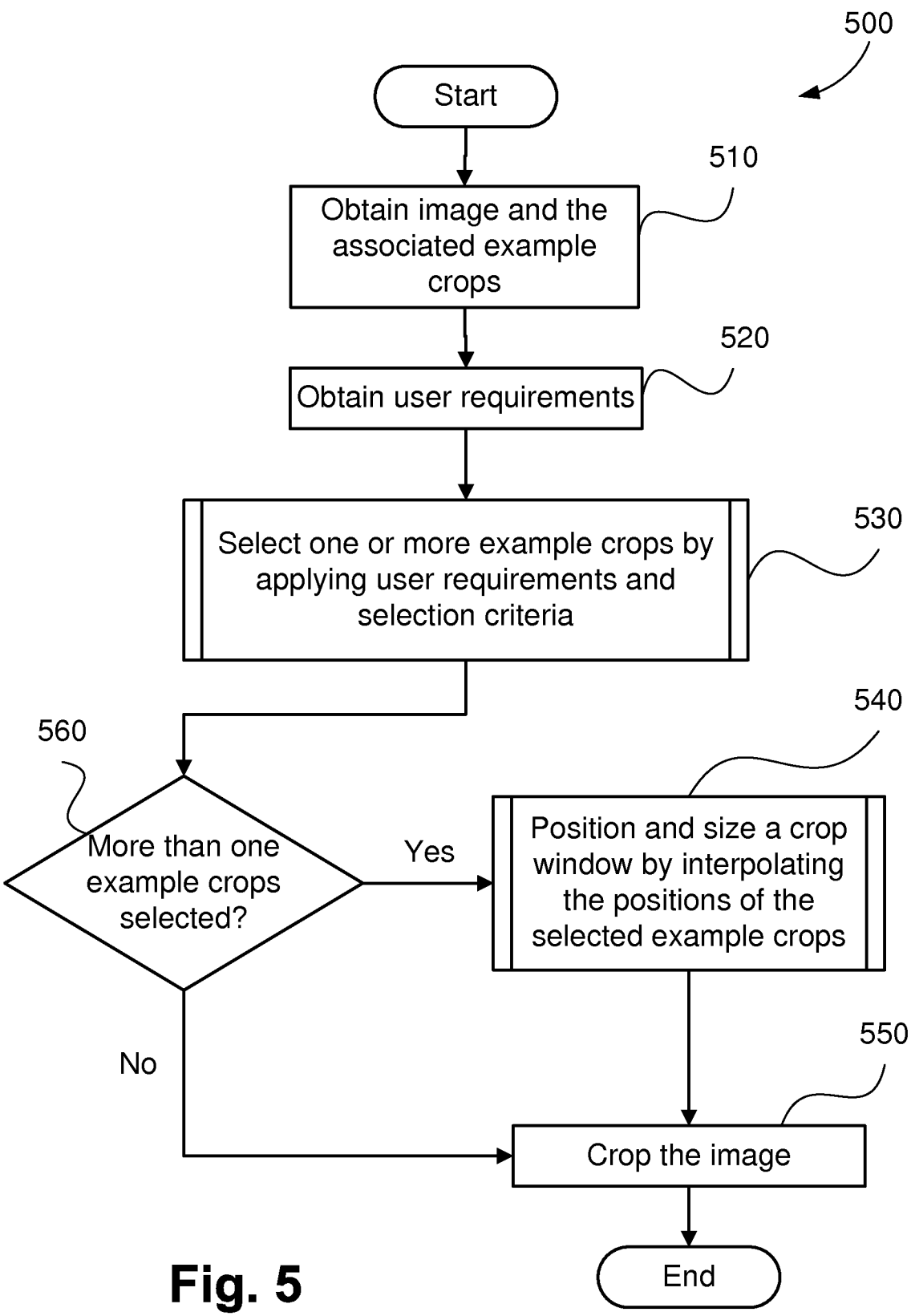
FIG. 5 is a schematic flow diagram illustrating a method of cropping a digital image.

FIG. 5 shows the sequence of steps involved in a process 500 of automated image cropping. The process 500 is typically formed as a sub-module of a document layout or publishing software application that has additional functionality not described herein and which is executable within the computer system 100. In step 510, a digital image is retrieved by the processor 105, for example from the HDD 110, along with several example crops associated with the image, such as seen in the upper portions of FIG. 4. Each example crop indicates an acceptable crop of the image and may or may not include the entire image itself. Example crops may overlap and may be stored in the storage device 109 as a collection of values representing positions in the original image. The digital image 210 and its associated example crops 420-460 once received are loaded into the memory device 106 of the computer system 100 to be processed. The example crops may be drawn by the user on manipulation of the GUI represented by the display 114, keyboard 103 and mouse pointer 103. The example crops may be retrieved from memory, such as the HDD 110

In step 520, user requirements are received. This typically involves the processor 105 detecting user inputs from the keyboard 102 and mouse 103 via the GUI represented on the display 114. The user requirements may include the height and width dimensions of the target crop region, the preferred aspect ratio of the target crop region, minimum and maximum aspect ratio allowed, and/or minimum and maximum scale factor allowed.

In step 530, the example crops received in step 510 are examined and analysed by the application executed by the processor 105. One or more of the example crops are selected by applying pre-determined selection criteria and user requirements received at step 520, including at least one property of the target crop region, such as height, width and aspect ratio. Details of the selection process are described in FIGS. 6 to 9.

In step 560, which follows step 530, the processor 105 performs a test of whether more than one example crop has been selected. If step 560 determines that more than one example crop has been selected, step 540 is executed by the processor 105 to determine the size and position of a crop window by interpolating the positions of the selected example crops. Details of the interpolation process are described in FIGS. 10 to 14.

If step 560 determines that exactly one example crop was selected in step 530, the selected example crop is used as a crop window and step 550 follows.

Step 550 also follows step 540 during which the processor 105 produces a crop of the image by retaining the image region within the crop window and discarding the image region outside the crop window. The cropped image may be stored in the memory, such as the HDD 110, separate from the original image 210. The cropped image may also be displayed on the display device 114.

Selection by Height and Width

Figure 6:
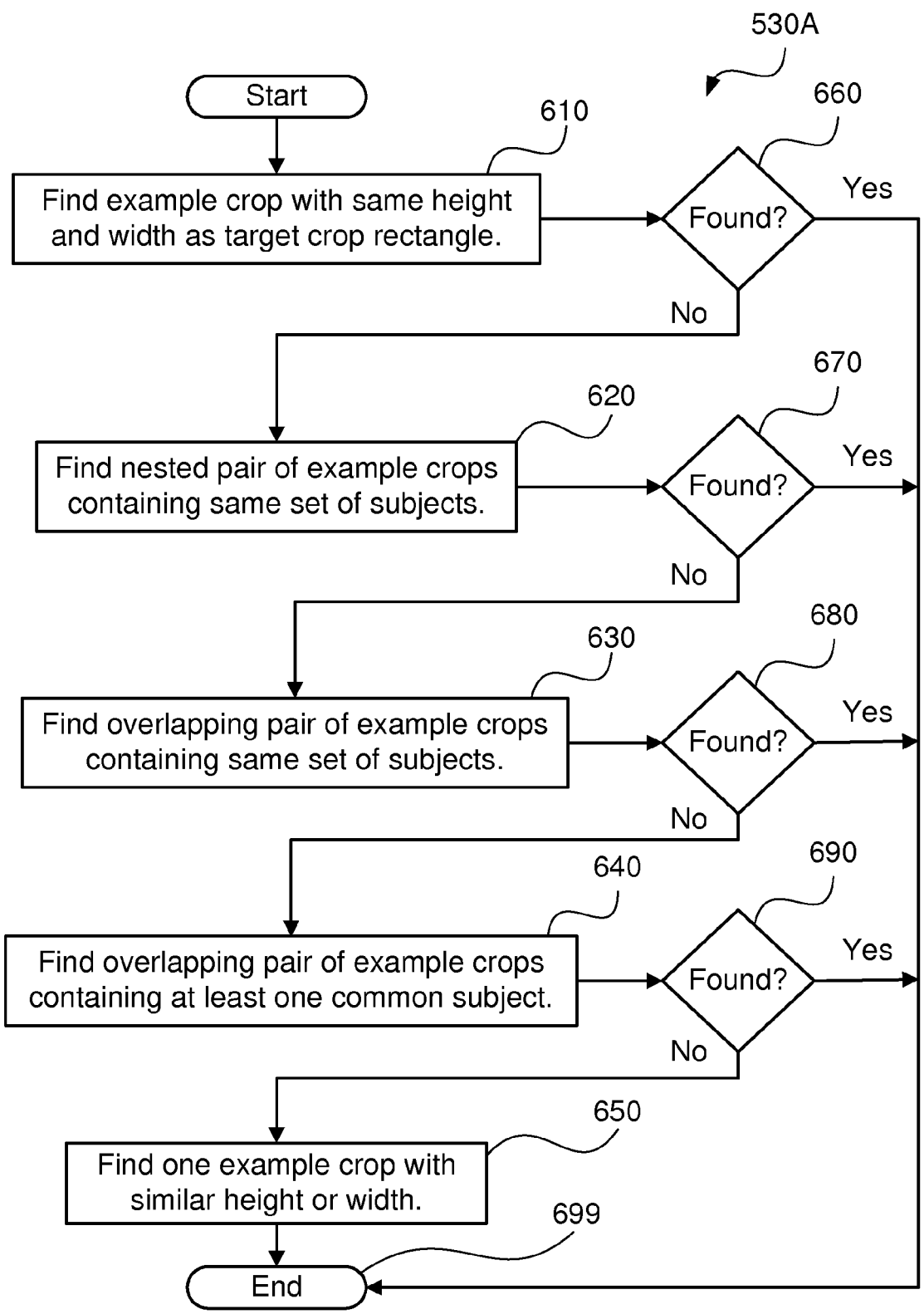
FIG. 6 is a schematic flow diagram illustrating a method of selecting one or more example crops as used in the method of FIG. 5.

In step 530, one or more of the example crops are selected by applying pre-determined selection criteria and user requirements. FIGS. 6 and 7 explain one example selection process 530A and selection criteria in more detail.

In FIG. 6, for the process 530A, initially step 610 compares the height and width dimensions of each example crop with the respective height and width dimensions of the target crop region. If one of the example crops is found to have the same height and width as the target crop region, that example crop is selected. Step 660 performs such a test, and where none of the example crops has the same height or width as the target crop region, then step 620 is executed.

Step 620 attempts to find a nested pair of example crops that contains the same set of subjects. A nested pair in the present implementation means that one of the example crops must fully contain the other example crop. In addition, one example crop of the pair must have a width and height greater than or equal to the target crop region, and the other example crop must have a width and height smaller than or equal to the target crop region.

Figure 7A:
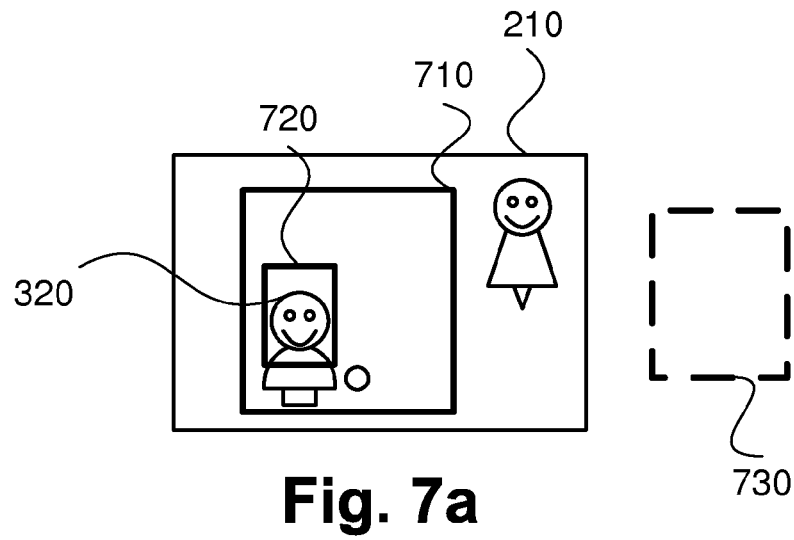
FIGS. 7a to 7c show three sets of example crops associated with the digital image and three target crop regions.

FIG. 7a shows a pair of nested example crops that satisfy the criteria of step 620 in the image 210. A first example crop 710 and a second example crop 720 contain the same set of subjects, and particularly the face of the human boy 320. The first example crop 710 fully contains the second example crop 720. The target crop region 730 has a height and width smaller than the height and width of the first example crop 710, and greater than the height and width of the second example crop 720.

If more than one pair of example crops satisfy the conditions stated in step 620, the pair with the largest overlapping area is selected for interpolation. In alternative implementations, the original image and its associated example crops are scaled as required in order to fulfil the conditions. The maximum and minimum scale factors can be obtained as part of the user requirements described in step 520.

Figure 7B:
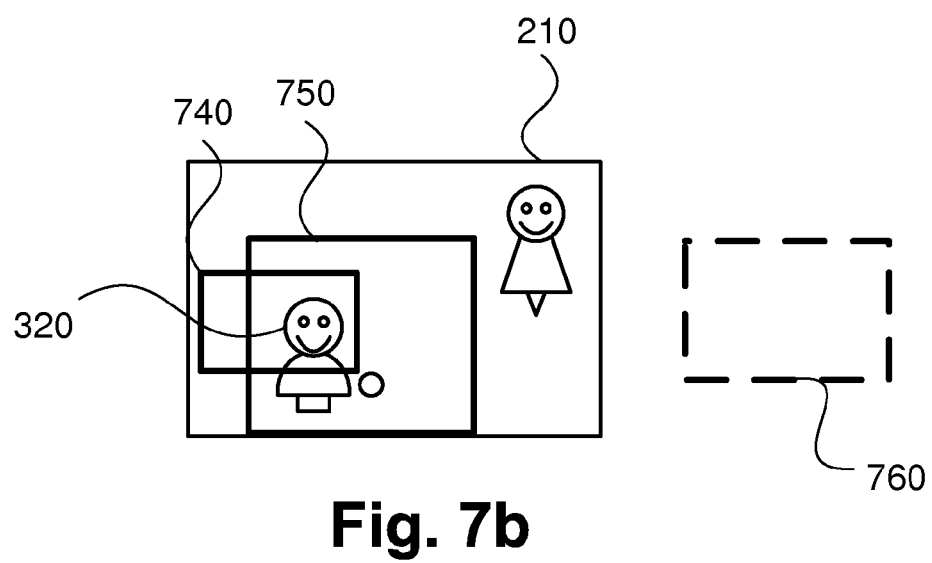

Step 670 tests the result of step 620 and where step 620 fails to find a pair of example crops that matches its criteria, step 630 is then executed. Step 630 attempts to find an overlapping pair of example crops that contains the same set of subjects. In this condition, the height of the target crop region is smaller than or equal to the height of one example crop and greater than or equal to the height of the other example crop. Also, the width of the target crop region is smaller than or equal to the width of one example crop and greater than or equal to the width of the other example crop. FIG. 7b shows a pair of example crops that satisfies the above criteria.

FIG. 7b shows a pair of overlapping example crops 740 and 750 of the image 210. The first example crop 740 and the second example crop 750 contain the same set of subjects, namely the face of the human boy 320. The first example crop 740 overlaps the second example crop 750. However the second example crop 750 does not fully contain the first example crop 740. A corresponding target crop region 760 has a width greater than the width of the first example crop 740, but smaller than the width of the second example crop 750, and a height greater than the height of the first example crop 740, but smaller than the height of the second example crop 750.

If more than one pair of example crops satisfy the conditions stated in step 630, the pair with the largest overlapping area is selected. In other implementations, the original image 210 and its associated example crops are again allowed to be scaled in order to fulfil the conditions. The maximum and minimum scale factors can be obtained as part of the user requirements described in step 520.

Figure 7C:
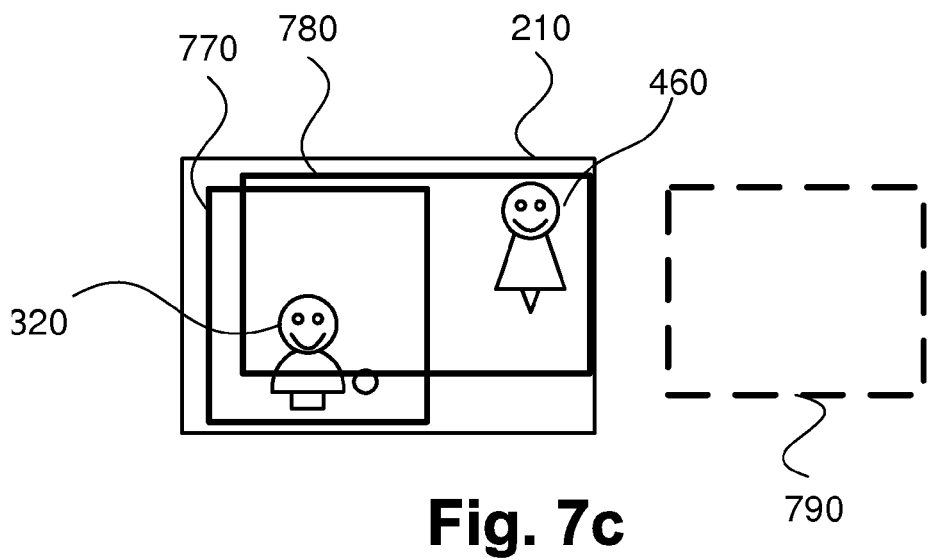

If step 680, which tests step 630, fails to find a pair of example crops that matches the criteria of 630, then step 640 is executed by the processor 105. Step 640 attempts to find an overlapping pair of example crops that contains at least one common subject. The overlapping pair may or may not be a nested pair. In addition, the height of the target crop region is smaller than or equal to the height of one example crop and greater than or equal to the height of the other example crop. Further, the width of the target crop region is smaller than or equal to the width of one example crop and greater than or equal to the width of the other example crop. FIG. 7c shows a pair of example crops that satisfy the above criteria.

FIG. 7c shows a pair of overlapping example crops 770 and 780 of the image 210. The first example crop 770 and the second example crop 780 contain one common subject, namely the face of the human boy 320. However the second example crop 780 contains the two subjects, in particular the face of the human boy 320 and the entirety of the human girl 460, while the first example crop 770 only contains one subject, in particular the face of the human boy 320. The two example crops 770 and 780 overlap each other. The target crop region 790 has a width greater than the width of the first example crop 770, but smaller than the width of the second example crop 780. The target crop region 790 has a height smaller than the height of the first example crop 770, but greater than the height of the second example crop 780.

If more than one pair of example crops satisfy the conditions stated in step 640, the pair with the largest overlapping area is selected. In other implementations, the original image 210 and its associated example crops are allowed to be scaled in order to fulfil the conditions. The maximum and minimum scale factors can be obtained as part of the user requirements described in step 520.

Step 690 determines if step 640 has failed to find a pair of example crops that matches its criteria, and if so, step 650 is executed.

Step 650 simply finds one example crop that has the closest or most similar height or width to the target crop region.

Where each of the tests 660, 670, 680 and 690 is satisfied (Yes), and after step 650, control is passed to step 699 where step 530A ends. Step 530A therefore establishes a set of cascading criteria to select one or more example crops according to user requirements. Where desired, the order of the criteria may be altered from that illustrated in FIG. 6 and described above.

Selection of Crop Examples by Aspect Ratio

Figure 8:
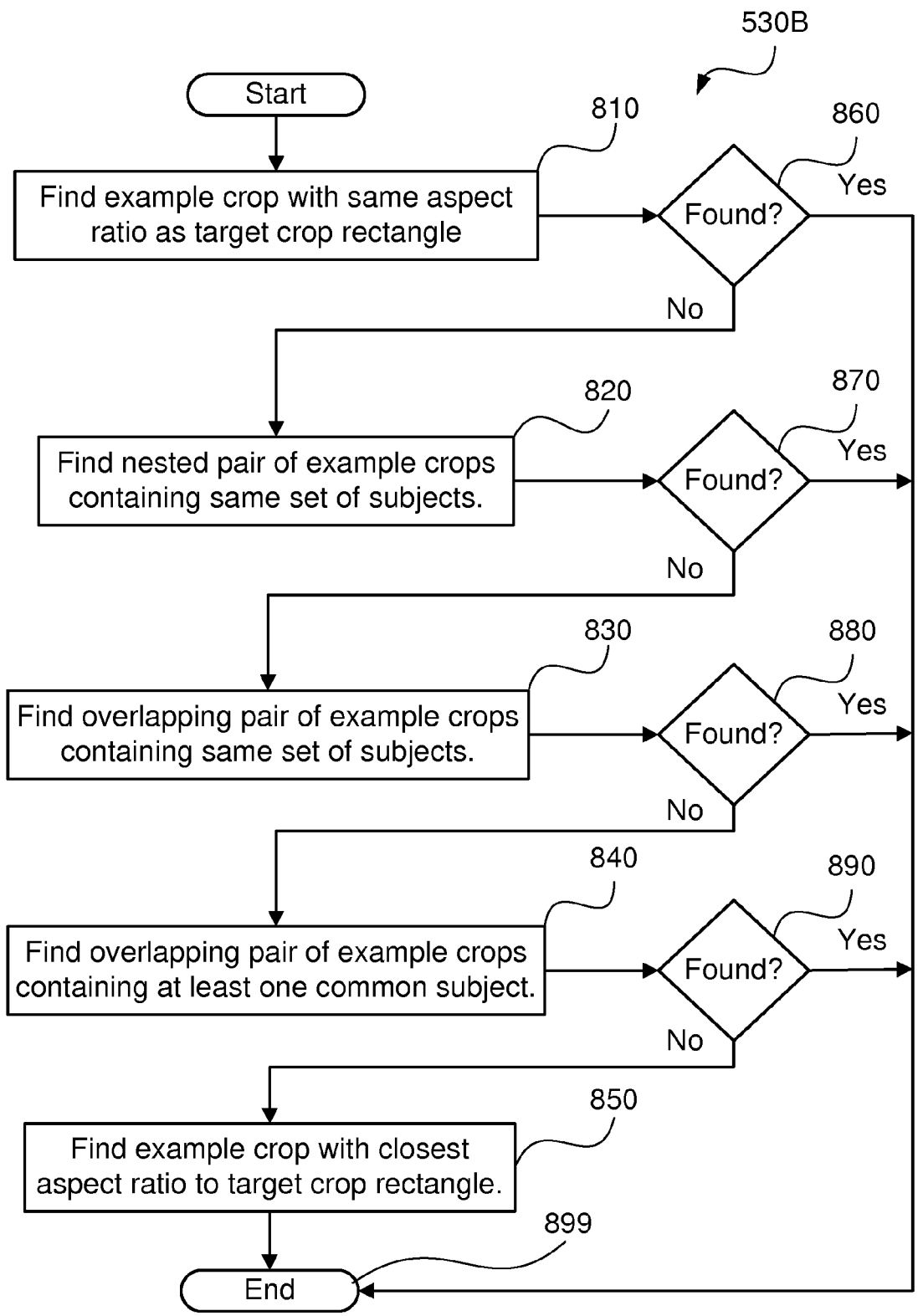
FIG. 8 is a schematic flow diagram illustrating a method of selecting one or more example crops as used in the method of FIG. 5.

In step 530 of FIG. 5, one or more of the example crops are selected by applying pre-determined selection criteria and user requirements. FIGS. 8 and 9 describe another example of the selection step 530B, where the aspect ratio defined as the height to width ratio is used to specify the target crop region.

Step 530B commences with step 810 which compares the aspect ratio of each example crop with the aspect ratio of the target crop region. If one of the example crops has the same aspect ratio as the target crop region, that example crop is selected at step 860 and the process 530B ends at step 899. If step 860 determines that none of the example crops has the same aspect ratio as the target crop region, then step 820 is executed.

Figure 9A:
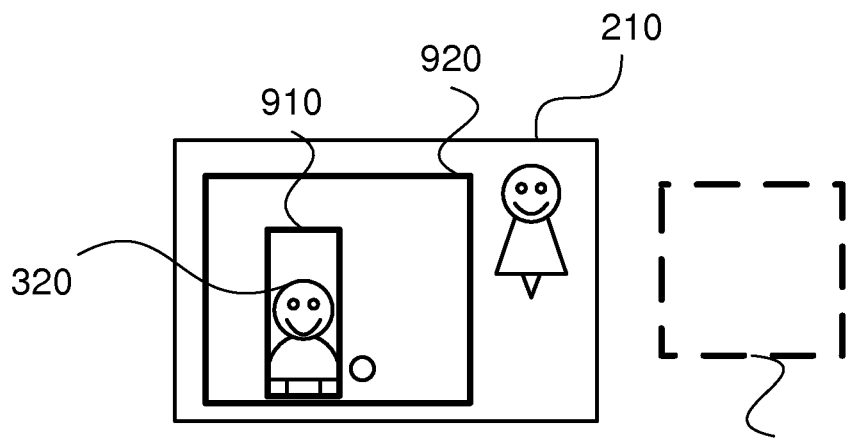
FIG. 9a shows a set of example crops associated with the digital image and a target crop region.

Step 820 attempts to find a nested pair of example crops that contains the same set of subjects. A nested pair means that one of the example crops must fully contain the other example crop. In addition, one example crop of the pair must have an aspect ratio greater than the target crop region, and the other example crop must have an aspect ratio smaller than the target crop region. FIG. 9a shows a pair of example crops 910 and 920 that satisfies the above criteria. The first example crop 910 and the second example crop 920 contain the same set of subjects, namely the face of the human boy 320. The second example crop 920 fully contains the first example crop 910. The target crop region 930 has a one-to-one aspect ratio. The first example crop 910 has an aspect ratio greater than the target crop region 930. The second example crop 920 has an aspect ratio smaller than the target crop region 930.

If more than one pair of example crops satisfy the conditions stated in step 820, the pair with the largest overlapping area is selected.

Figure 9B:
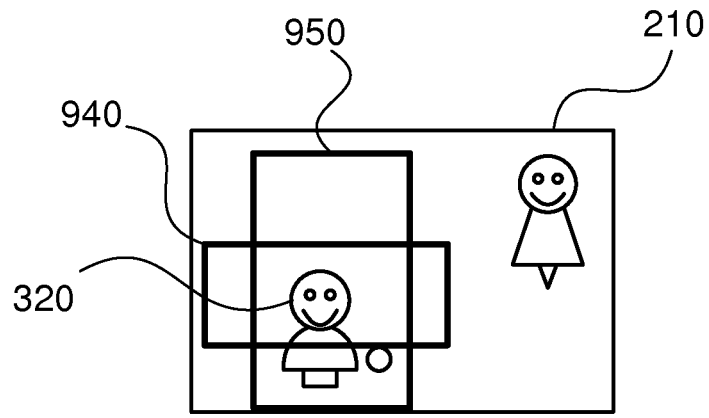
FIGS. 9b and 9c show two further sets of example crops associated with the digital image.

Step 870 then tests step 820 and if such is found to fail to identify a pair of example crops that matches its criteria, then step 830 is executed. In step 830, the processor 105 attempts to find an overlapping pair of example crops that contains the same set of subjects. In addition, one example crop of the pair must have an aspect ratio greater than the target crop region, and the other example crop must have an aspect ratio smaller than the target crop region. FIG. 9b shows a pair of example crops 940 and 950 of the image 210 that satisfies the above criteria. The first example crop 940 and the second example crop 950 contain the same set of subjects, namely the face of the human boy 320. The two example crops 940 and 950 overlap each other. However, neither of the two example crops 940 and 950 fully contains the other. The first example crop 940 has an aspect ratio smaller than the target crop region 930. The second example crop 950 has an aspect ratio greater than the target crop region 930.

If more than one pair of example crops satisfy the conditions stated in step 830, the pair with the largest overlapping area is desirably selected.

Figure 9C:
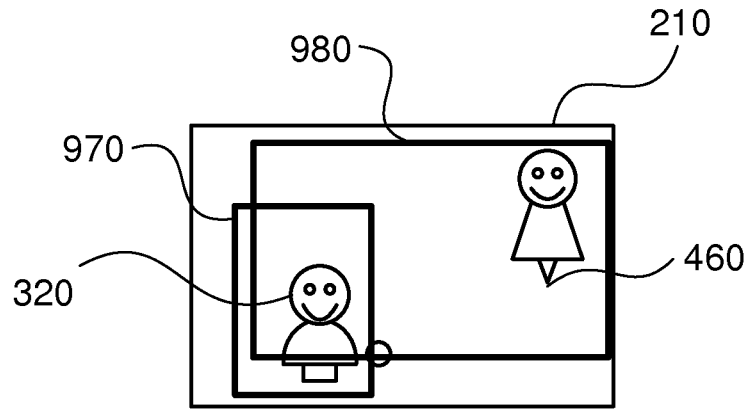

Step 880 tests step 830 and if such is found to fail to identify a pair of example crops that matches its criteria, then step 840 is executed. Step 840 attempts to find an overlapping pair of example crops that contains at least one common subject. The overlapping pair may or may not be a nested pair. In addition, one example crop of the pair must have an aspect ratio greater than the target crop region, the other example crop must have an aspect ratio smaller than the target crop region. FIG. 9c shows a pair of example crops 970 and 980 of the image 210 that satisfies the above criteria. The first example crop 970 and the second example crop 980 contain one common subject, namely the face of the human boy 320. However the second example crop 980 contains the other subject 460, while the first example crop 970 only contains one subject 320. The two example crops 970 and 980 overlap each other. The second example crop 980 has an aspect ratio smaller than the target crop region 930. The first example crop 970 has an aspect ratio greater than the target crop region 930.

If more than one pair of example crops satisfy the conditions stated in step 840, the pair with the largest overlapping area is desirably selected.

If Step 890 determines that step 840 has failed to find a pair of example crops that matches its criteria, step 850 is executed. Step 850 finds the example crop that has the closest or most similar aspect ratio to the target crop region.

Where each of the tests 860, 870, 880 and 890 is satisfied (Yes), and after step 850, control is passed to step 899 where step 530B ends. Step 530B therefore establishes another set of cascading criteria to select one or more example crops according to user requirements. Where desired, the order of the criteria may be altered from that illustrated in FIG. 8 and described above.

Interpolation Process

Figure 10:
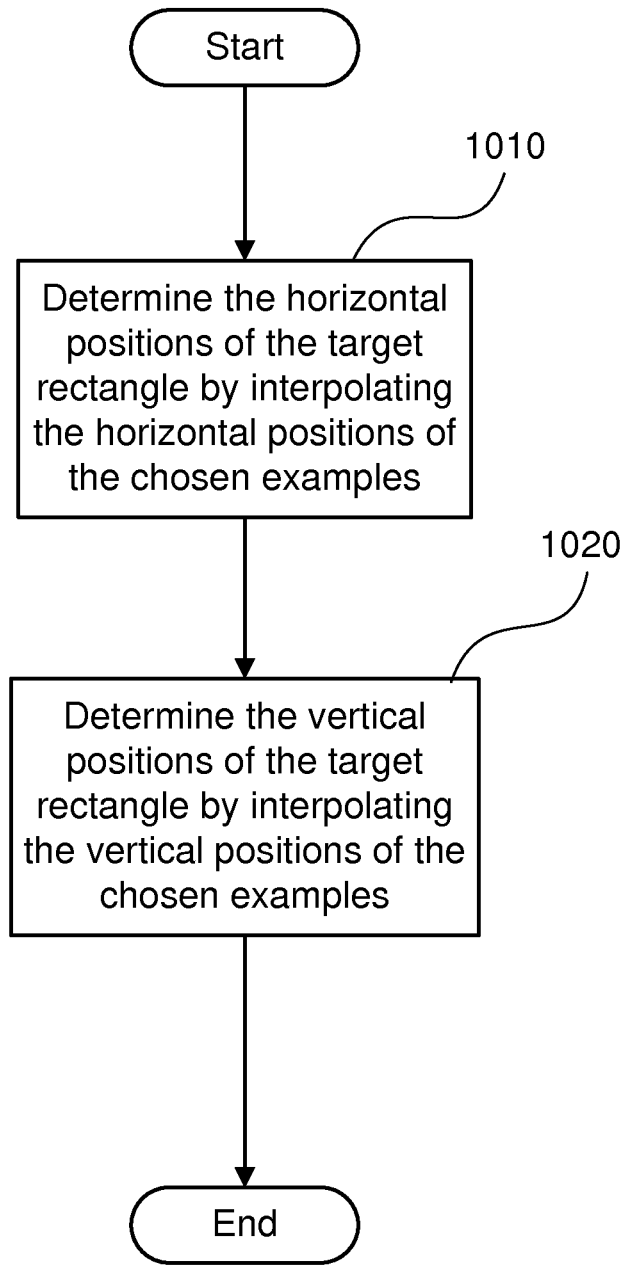
FIG. 10 is a schematic flow diagram illustrating a method of interpolating a pair of example crops as used in the method of FIG. 5.
Figure 11:
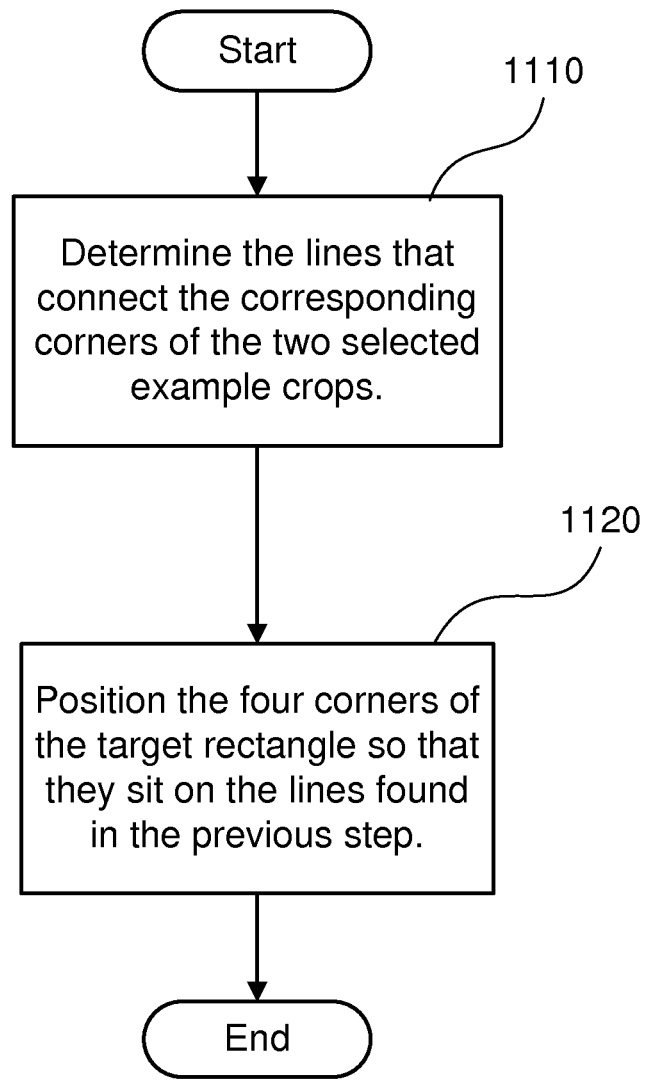
FIG. 11 is a schematic flow diagram illustrating a method of interpolating a pair of example crops as used in the method of FIG. 5.

Once a pair of example crops is selected in step 530, step 540 determines the position of the target crop window by interpolating the positions of the selected example crops. FIGS. 10 and 11 show flowcharts to further explain the interpolation process 540 in more detail.

FIG. 10 shows the sequence of steps to interpolate between two example crops, according to one implementation, in which the user requirements specify the height and width of the target crop region.

Step 1010 determines the horizontal position of the crop window by interpolating the horizontal positions of the selected example crops. The crop window is positioned so that its left edge position relative to the left edges of the example crops is the same as the relative position of its right edge. This is discussed further with reference to FIG. 12 below.

Step 1020 determines the vertical position of the target crop window by interpolating the vertical positions of the selected example crops. The crop window is positioned so that its top edge position relative to the top edges of the example crops is the same as the relative position of its bottom edge. This is discussed further with reference to FIG. 13 below.

The final position of the crop window is formed by the horizontal position determined in step 1010 and the vertical position determined in step 1020.

In an alternative implementation, the interpolation process depicted in FIG. 11 not only determines the position of the crop window, but also determines the size of the crop window. This is achieved by a first step 1110 that connects the corners of the selected example crops using four line segments. One of the line segments connects the top left corners of the two example crops, another line segment connects the top right corners, another connects the bottom left corners and the last one connects the bottom right corners. In step 1120, the crop window is positioned and sized so that its four corners sit on the four line segments found in step 1110, and its height-to-width ratio is the same as the user-specified aspect ratio. This is described further with reference to FIG. 14.

Interpolation by Height and Width

In the process of FIG. 10, the horizontal positions and the vertical positions of the two rectangular example crops are interpolated independently.

Figure 12:
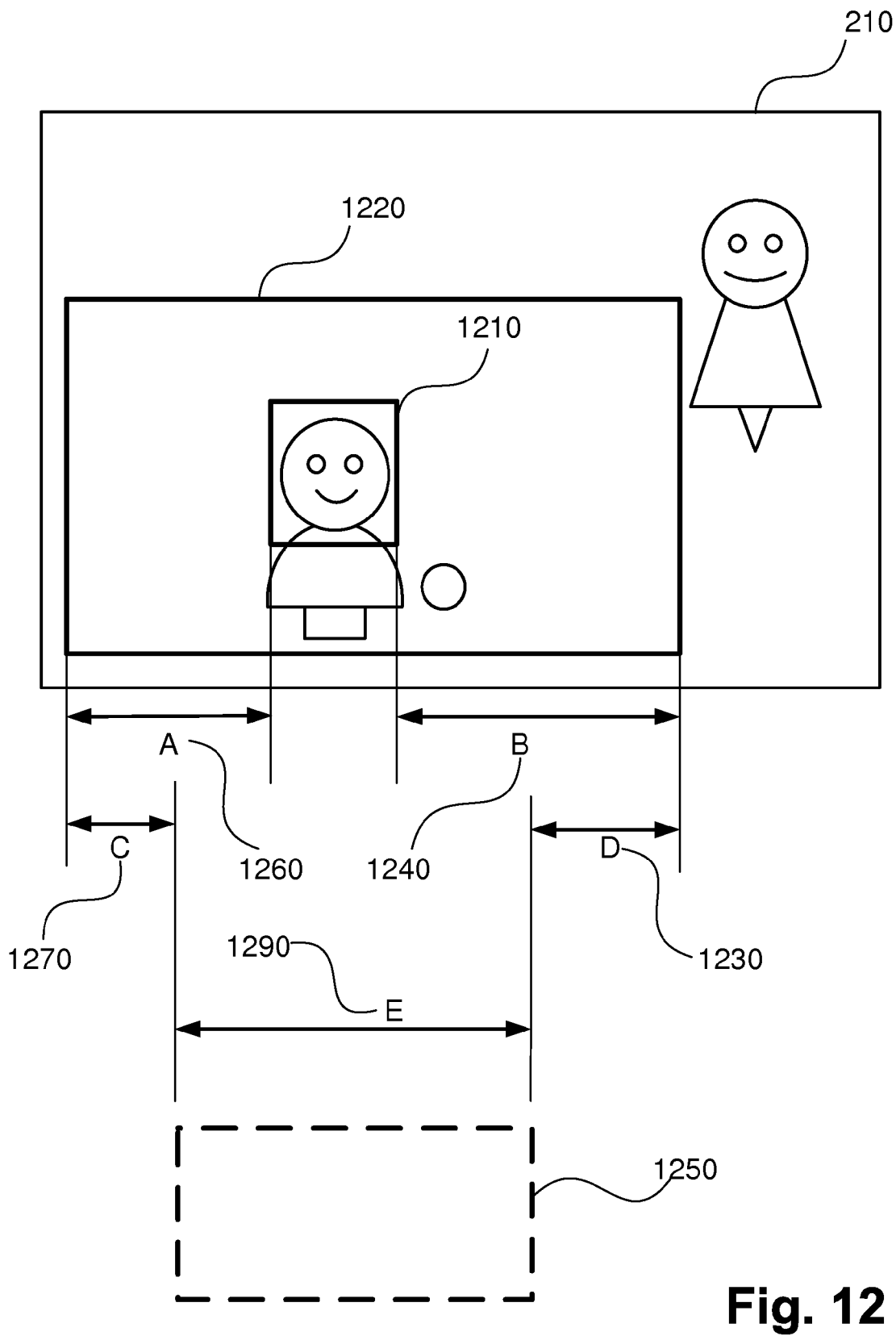
FIG. 12 shows a digital image and associated example crops to illustrate the interpolation process as used in the method of FIG. 10.

FIG. 12 shows an example of how to interpolate the horizontal positions of the first example crop 1210 and the second example crop 1220 of the image 210, given that the target crop region 1250 has a width E 1290. The horizontal position of a crop window with width E 1290 is determined so that the following formula must be satisfied:

$$\frac{C}{A} = \frac{D}{B}$$

where:
C 1270 is the distance between the left edge of the second example crop 1220 and the left edge of the crop window;
A 1260 is the distance between the two left edges of the example crops 1210 and 1220;
D 1230 is the distance between the right edge of the second example crop 1220 and the right edge of the crop window; and
B 1240 is the distance between the two right edges of the example crops 1210 and 1220.

Figure 13:
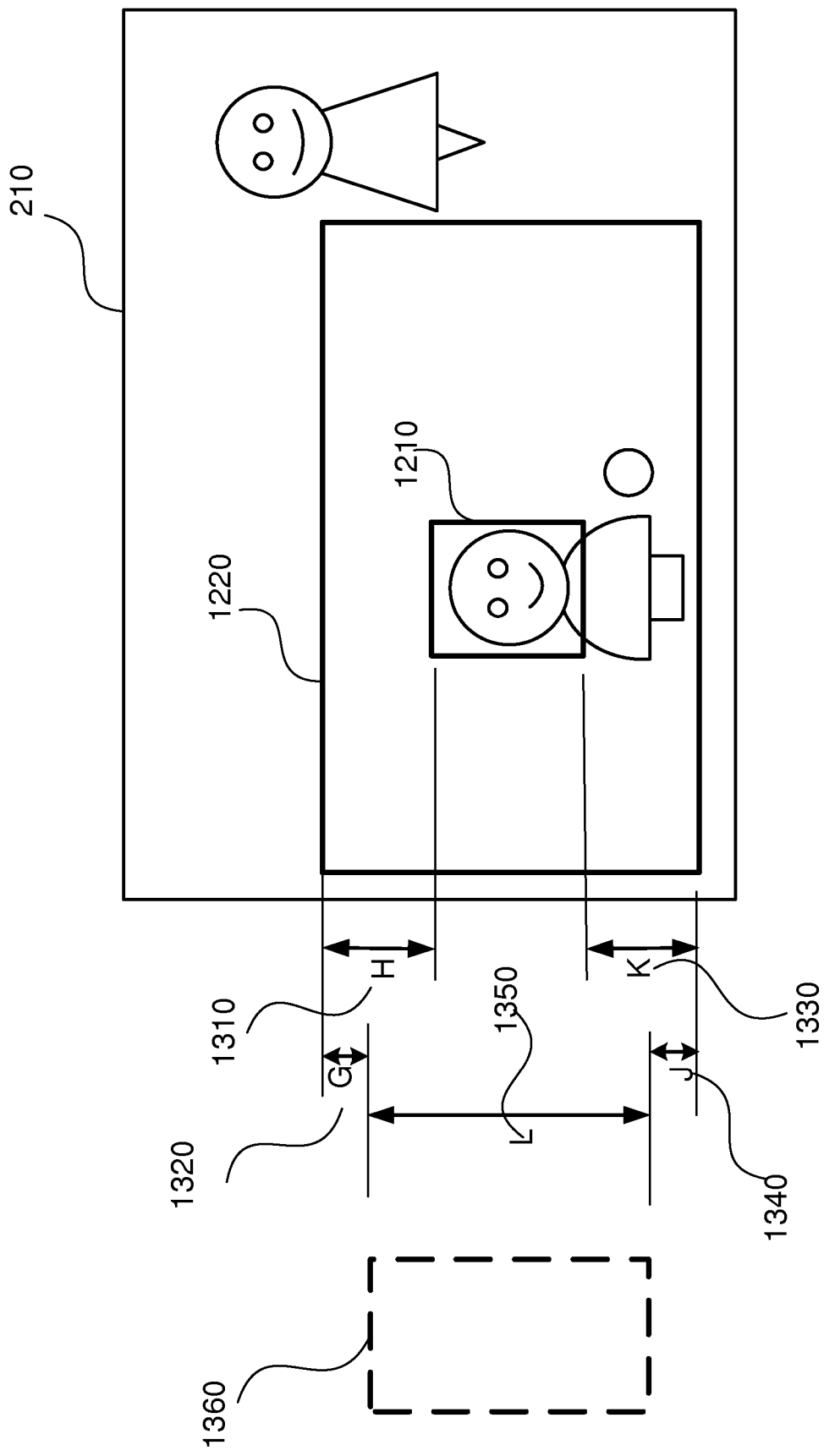
FIG. 13 shows a digital image and associated example crops to further illustrate the interpolation process as used in the method of FIG. 10.

Similarly, the vertical position of the crop window is determined by interpolating the vertical positions of the first example crop 1210 and the second example crop 1220, as shown in FIG. 13. Given a target crop region 1360 with height L 1350, a crop window with the same height L 1350 is positioned between the two example crops 1210 and 1220 so that the following formula must be satisfied:

$$\frac{G}{H} = \frac{J}{K}$$

where:
G 1320 is the distance between the top edge of the second example crop 1220 and the top edge of the crop window;
H 1310 is the distance between the two top edges of the example crops 1210 and 1220;
J 1340 is the distance between the bottom edge of the second example crop 1220 and the bottom edge of the crop window; and
K 1330 is the distance between the two bottom edges of the example crops 1210 and 1220.

After interpolating the horizontal positions and the vertical positions of the two rectangular example crops independently to produce a horizontal position and a vertical position for a crop window, the final position of the crop window is taken as the combined horizontal and vertical coordinates.

Interpolation by Aspect Ratio

Figure 14:
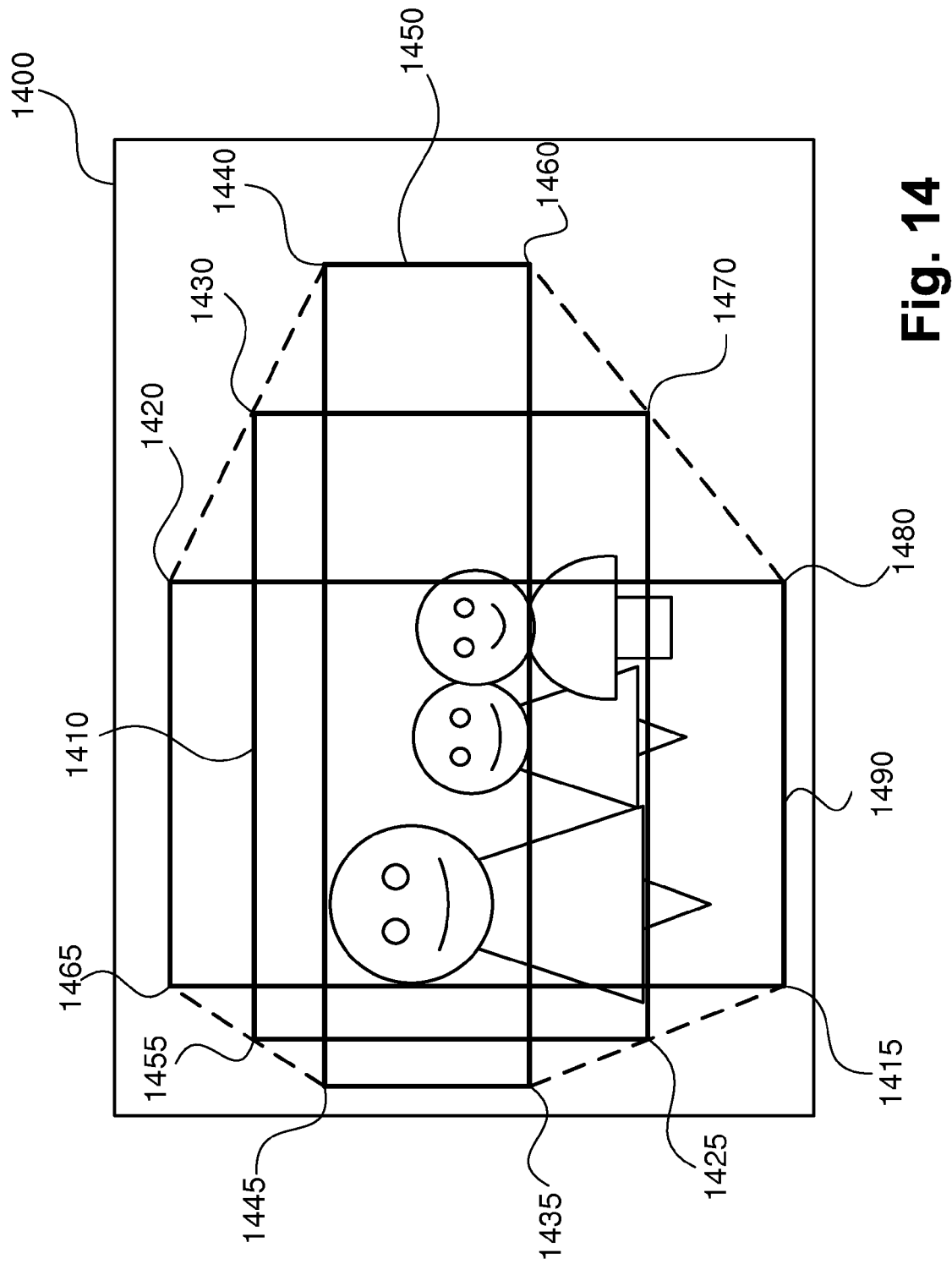
FIG. 14 shows a digital image and associated example crops to illustrate the interpolation process as used in the method of FIG. 11.

FIG. 14 illustrates how to interpolate between two example crops with different aspect ratios to determine the position of a crop window with a user-specified aspect ratio. Given a user-specified target crop region with aspect ratio AR, two example crops 1450 and 1490 of an image 1400 are selected so that one of the example crops 1450 has an aspect ratio smaller than the target aspect ratio AR, and the other example crop 1490 has an aspect ratio greater than the target aspect ratio AR.

A crop window 1410 with aspect ratio AR is scaled and positioned so that:

- a top left corner 1455 is located on the line segment that connects the top left corners 1445 and 1465 of the two example crops 1450 and 1490;
- a top right corner 1430 is located on the line segment that connects the top right corners 1440 and 1420 of the two example crops 1450 and 1490;
- a bottom left corner 1425 is located on the line segment that connects the bottom left corners 1435 and 1415 of the two example crops 1450 and 1490; and
- a bottom right corner 1470 is located on the line segment that connects the bottom right corners 1460 and 1480 of the two example crops 1450 and 1490.

The scaling and positioning described above results in an interpolated crop window 1410 having an aspect ratio substantially similar to the target crop region with aspect ratio AR.

It will be appreciated from the arrangement of FIG. 14 that the aspect ratio AR of the crop window 1410 must be between that of each of the example crop windows 1450 and 1490. If not, a suitable crop window is calculated based on an example crop with the closest aspect ratio to the desired aspect ratio AR. In an alternative implementation, extrapolation from example crops may be used to determine the bounds of the crop window. However, using extrapolation may result in a crop window that does not fit within the bounds of the original image, and hence additional scaling may be required.

INDUSTRIAL APPLICABILITY

The arrangements described are applicable to the computer and data processing industries and particularly for the assisted or automated cropping of images for document layout purposes.

The foregoing describes only some embodiments of the present invention, and modifications and/or changes can be made thereto without departing from the scope and spirit of the invention, the embodiments being illustrative and not restrictive.

We claim:

1. A computer implemented method of producing a cropped image from an original image for a given target crop region where the cropped image is to be inserted, said method being performed by a processor and comprising the steps of:
    (a) receiving, by the processor, a plurality of example crops, each example crop corresponding to at least a part of the original image;
    (b) selecting two partially overlapping non-nested example crops from the plurality of example crops based on at least a property of the target crop region, the selected example crops having an overlapping area containing a subject common for the selected example crops;
    (c) determining a crop window using interpolation between the selected non-nested example crops based on at least the property of the target crop region; and
    (d) cropping the original image with the determined crop window to produce the cropped image.

2. A method according to claim 1, wherein the selected example crops have different aspect ratios and correspond to a common part of the original image.

3. A method according to claim 1, wherein selecting two of the example crops comprises the sub-steps of:
    (ba) selecting a first example crop, at least one dimension of said first example crop being greater than a respective at least one dimension of the target crop region; and
    (bb) selecting a second example crop, at least one dimension of said second example crop being smaller than a respective at least one dimension of the target crop region.

4. A method according to claim 1, wherein the selecting of two example crops comprises the sub-steps of:
    (ba) selecting a first example crop, an aspect ratio of said first example crop being greater than an aspect ratio of the target crop region; and
    (bb) selecting a second example crop, an aspect ratio of said second example crop being smaller than the aspect ratio of the target crop region.

5. A method according to claim 1, wherein determining a crop window comprises the sub-step of:
    determining at least one of a horizontal and vertical position of the target region by interpolating the at least one respective horizontal and vertical positions of the selected example crops.

6. A method according to claim 1, wherein determining a crop window comprises the sub-step of:
    interpolating between the selected example crops to produce a crop window with an aspect ratio substantially similar to the aspect ratio of the target crop region.

7. A method according to claim 1 further comprising the step of:
    (e) storing the cropped image to a non-transitory computer readable storage medium.

8. A method according to claim 7, wherein the storing step comprises the step of locating the cropped image in a document and storing the document to the non-transitory computer readable storage medium.

9. A non-transitory computer readable storage medium having a computer program recorded thereon, the program being executable by a processor of a computer apparatus to produce a cropped image from an original image for a given target crop region where the cropped image is to be inserted, said program comprising:
    code for receiving a plurality of example crops, each example crop corresponding to at least a part of the original image;
    code for selecting two partially overlapping non-nested example crops from the plurality of example crops based on at least a property of the target crop region, the selected example crops having an overlapping area containing a subject common for the selected example crops;
    code for determining a crop window using interpolation between the non-nested selected example crops based on at least the property of the target crop region; and
    code for cropping the original image with the determined crop window to produce the cropped image.

10. A non-transitory computer readable storage medium according to claim 9, wherein:
the selected example crops have different aspect ratios and correspond to a common part of the original image.

11. A non-transitory computer readable storage medium according to claim 9, wherein the code for selecting two of the example crops comprises:
code for selecting a first example crop, at least one dimension of said first example crop being greater than a respective at least one dimension of the target crop region; and
code for selecting a second example crop, at least one a dimension of said second example crop being smaller than a respective at least one dimension of the target crop region.

12. A non-transitory computer readable storage medium according to claim 9, wherein the code for selecting two of the example crops comprises:
code for selecting a first example crop, the aspect ratio of said first example crop being greater than the aspect ratio of the target crop region; and
code for selecting a second example crop, the aspect ratio of said second example crop being smaller than the aspect ratio of the target crop region.

13. A non-transitory computer readable storage medium according to claim 9, wherein the code for determining a crop window comprises at least one of:
(i) code for determining at least one of a horizontal and vertical position of the target region by interpolating the at least one respective horizontal and vertical positions of the selected example crops; and
(ii) code for interpolating between the selected example crops to produce a crop window with an aspect ratio substantially similar to the aspect ratio of the target crop region.

14. A non-transitory computer readable storage medium according to claim 9, further comprising:
code for storing the cropped image to a non-transitory computer readable storage medium.

15. Computer apparatus having a non-transitory computer readable storage medium according to claim 9, the program being executable within the computer apparatus to produce the cropped image.

16. Computer apparatus configured to produce a cropped image from an original image for a given target crop region where the cropped image is to be inserted, said apparatus comprising a processor and a memory, the memory storing software code executable by the processor to cause the computer apparatus to comprise:
means for receiving from a memory a plurality of example crops, each example crop corresponding to at least a part of the original image;
means for selecting two partially overlapping non-nested example crops from the plurality of example crops based on at least a property of the target crop region, the selected example crops having an overlapping area containing a subject common for the selected example crops; and
means for determining a crop window using interpolation between the selected non-nested example crops based on at least the property of the target crop region; and
means for cropping the original image with the determined crop window to produce the cropped image.

17. Computer apparatus according to claim 16, further comprising output means by which the cropped image is one of displayed on a display device or stored in the memory by the processor.

* * * * *